(12) United States Patent
Teranisi et al.

(10) Patent No.: US 7,933,663 B2
(45) Date of Patent: Apr. 26, 2011

(54) SAFETY MASTER

(75) Inventors: Keiichi Teranisi, Numazu (JP); Naoaki Ikeno, Kusatsu (JP); Toshiyuki Nakamura, Ritto (JP); Takehiko Hioka, Ritto (JP); Yasuki Yoda, Ritto (JP); Isao Yamashita, Yokohama (JP)

(73) Assignee: Omron Corporation, Kyoto (JP)

( * ) Notice: Subject to any disclaimer, the term of this patent is extended or adjusted under 35 U.S.C. 154(b) by 349 days.

(21) Appl. No.: 12/330,091

(22) Filed: Dec. 8, 2008

(65) Prior Publication Data

US 2009/0171472 A1   Jul. 2, 2009

(30) Foreign Application Priority Data

Dec. 28, 2007   (JP) .................. 2007-340548

(51) Int. Cl.
*G05B 19/18* (2006.01)
*G06F 13/00* (2006.01)
*G06F 15/76* (2006.01)
*G06F 15/00* (2006.01)

(52) U.S. Cl. .............. 700/3; 709/208; 710/110; 712/31
(58) Field of Classification Search ............... 700/3, 79; 710/110; 712/31
See application file for complete search history.

(56) References Cited

U.S. PATENT DOCUMENTS

| | | | |
|---|---|---|---|
| 6,618,628 B1 * | 9/2003 | Davlin et al. | 700/3 |
| 6,711,445 B1 * | 3/2004 | Heath et al. | 700/3 |
| 6,952,618 B2 * | 10/2005 | Davlin et al. | 700/3 |
| 7,254,452 B2 * | 8/2007 | Davlin et al. | 700/3 |
| 7,634,320 B2 * | 12/2009 | Sakurai | 700/3 |
| 7,774,074 B2 * | 8/2010 | Davlin et al. | 700/3 |

FOREIGN PATENT DOCUMENTS

JP   11-242507   9/1999

* cited by examiner

*Primary Examiner* — Albert Decady
*Assistant Examiner* — Sivalingam Sivanesan
(74) *Attorney, Agent, or Firm* — Foley & Lardner LLP

(57) ABSTRACT

A safety master configured to communicate with a plurality of safety slaves over a safety field network or with a plurality of safety local I/O units connected by a safety back plane bus of the safety master, wherein each of the plurality of safety slaves and safety local I/O units allow connection to safety I/O devices in a plurality of cell equipment, and wherein the safety master receives a status signal indicating a "safe state" or an "unsafe state" related to cell equipment from each of the corresponding plurality of safety slaves or safety local I/O units, and controls operation/stop of cell equipment by executing an interlock operation program with the received status signal as an input to output an operation instruction signal.

11 Claims, 13 Drawing Sheets

FBD  Case of function block diagram

LD  Case of ladder program

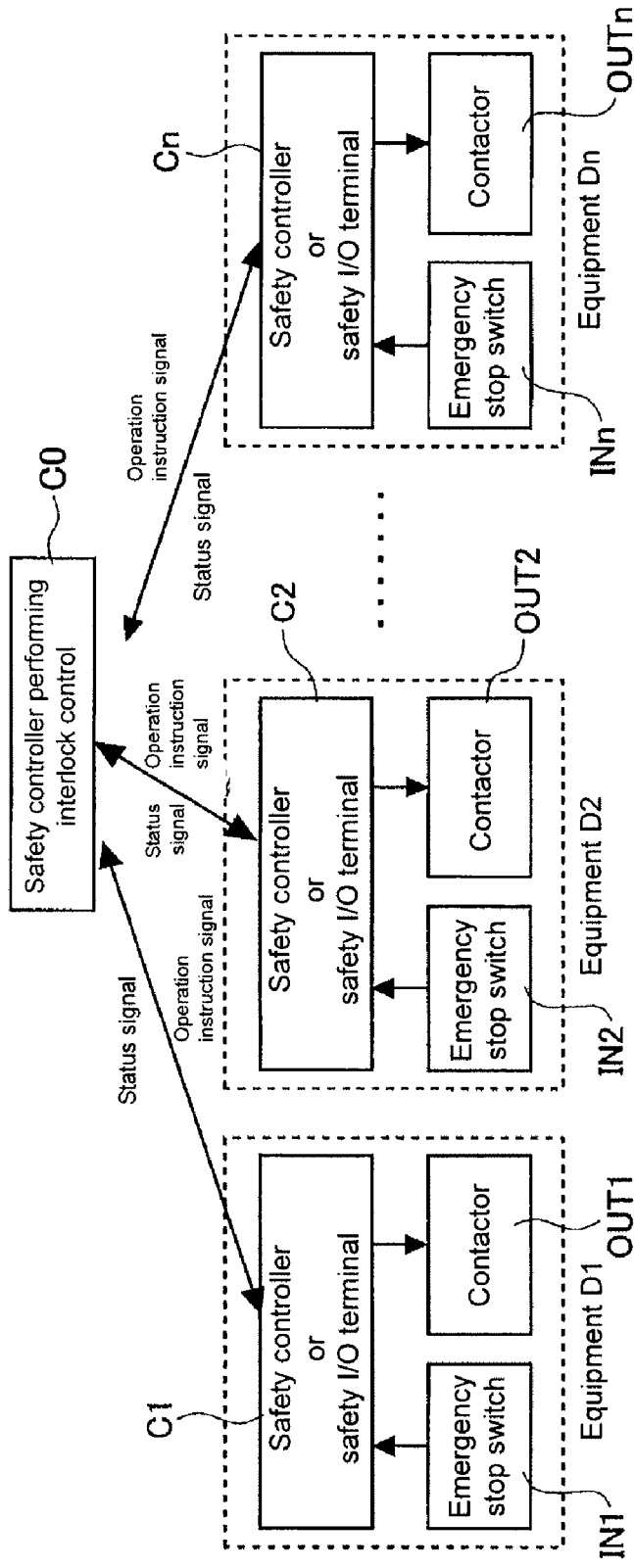
Fig. 12A  Configuration view of safety control system
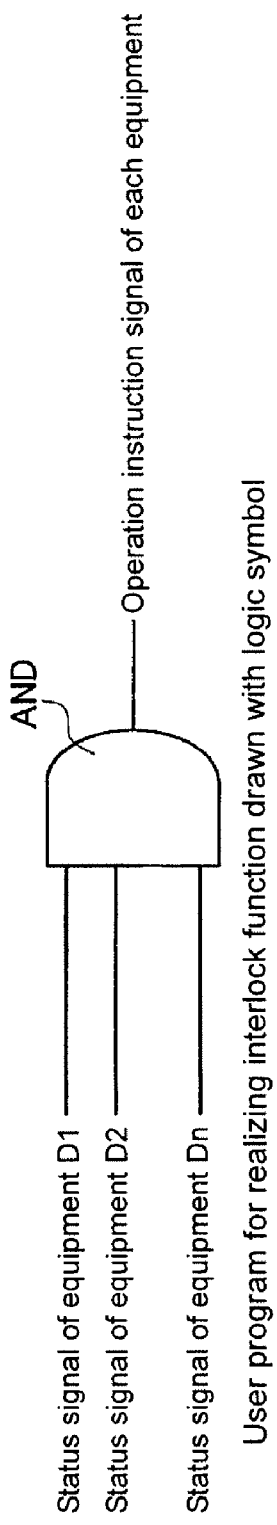
Fig. 12B  User program for realizing interlock function drawn with logic symbol Original program example Interlock invalidation measure when equipment D2 is absent (I)

Interlock invalidation measure when equipment D2 is absent (II)

SAFETY MASTER

This application claims priority from Japanese patent application P2007-340548, filed on Dec. 28, 2007. The entire content of the aforementioned application is incorporated herein by reference.

BACKGROUND OF THE INVENTION

1. Technical Field

The present invention relates to a safety controller for handling an input device (emergency stop switch, light curtain etc.) adapted to a predetermined safety standard and an output device (safety contactor, safety relay etc.) adapted to a predetermined safety standard, in particular, to a safety controller (hereinafter referred to as "safety master") incorporating a user program for realizing an interlock function among a plurality of equipment including the input/output device adapted to a predetermined safety standard.

2. Related Art

For instance, a manufacturing system applied to automobiles, semiconductors, and the like is generally configured by coupling a few pieces of equipment. Each of such equipment is performed with various safety measures and an interlock is adopted among the equipment, so that safety measures for an entire manufacturing system are performed.

Explanatory views of one example of an entire manufacturing system performed with safety measures of each equipment and with safety measures for the entire manufacturing system are shown in FIGS. 12A and 12B. As shown in FIG. 12A, the entire manufacturing system is configured by n equipment D1 to Dn in this example.

Each equipment D1 to Dn includes an input device (emergency stop switch is illustrated in the example) IN1 to INn adapted to a predetermined safety standard, and an output device (contactor is illustrated in the example) OUT1 to OUTn adapted to a predetermined safety standard.

Each equipment D1 to Dn further includes a safety controller or a safety remote I/O terminal C1 to Cn functioning as a "safety slave" to manage the input devices IN1 to INn and the output devices OUT1 to OUTn.

Such safety controllers or safety remote I/O terminals C1 to Cn are communicable with a safety controller C0 functioning as a "safety master" by way of a safety field network (not shown).

The "safety master" and the "safety slave" refers to a master-servant relationship in processes of acquisition of a status signal related to interlock and output of an operation instruction signal according to the present invention, and differs from the relationship of "master" and "slave" in the general field network.

A status signal indicating whether the relevant equipment is in a "safe state" or in an "unsafe state" is transmitted at a predetermined timing to the safety controller (i.e., "safety master") C0 from each safety controller (i.e., "safety slave") C1 to Cn and the like of each equipment D1 to Dn. In this case, the content of the status signal is defined to be ON ("1") when in the "safe state", and OFF ("0") when in the "unsafe state".

If one of the equipment D1 to Dn does not exist, the content of the status signal corresponding to the equipment that does not exist of the status signals received on a side of the safety controller C0 is defined to be OFF ("0"), which corresponds to the "unsafe state".

The operation instruction signal instructing whether to have the relevant equipment in an "operation state" or in a "stopped state" in which a power supply is shielded is transmitted at a predetermined timing to each safety controller or each safety remote I/O terminal C1 to Cn from the safety controller C0.

In this case, the content of the operation instruction signal is defined to be ON ("1") when in the "operation state instruction" and OFF ("0") when in the "stopped state instruction".

A user memory (not shown) in the safety controller C0 stores a safety control user program including interlock function. The interlock function realization user program may be represented in a logic symbol diagram, and for example, may be represented as a multi-input logical product circuit AND having the status signal received from each equipment as the input and the operation instruction signal to each equipment as the output, as shown in FIG. 12B.

According to such configuration, if all of the plurality of equipment D1 to Dn configuring the manufacturing system exists, and each of such equipment is in a predetermined "safe state", the content of the status signal of each equipment D1 to Dn received on the side of the safety controller C0 all becomes ON ("1"), and thus the output of the multi-input logical product circuit AND configuring the interlock function becomes ON ("1").

Then, the content of the operation instruction signal received on each equipment side all becomes ON ("1"), whereby all pieces of the equipment D1 to Dn can be in the "operation state", thereby enabling the operation of the entire manufacturing system.

In the operation state of the manufacturing system, if the "unsafe state" is found in one of the equipment D1 to Dn, the content of the status signal transmitted to the safety controller C0 conducting the interlock control from the safety controller etc. of the equipment in the "unsafe state" becomes OFF ("0") indicating the "unsafe state", and thus the output of the multi-input logical product circuit AND configuring the interlock function incorporated in the user program becomes OFF ("0").

The content of the operation instruction signal received on each equipment side then all becomes OFF ("0"), whereby all pieces of equipment D1 to Dn are in the "stopped state", and the entire manufacturing system is in the stopped state in which the power supply is shielded.

In a state where one of the equipment D1 to Dn configuring the manufacturing system is missing ("absent") or in a state where communication failure, power disconnection and the like occurred in one of the equipment D1 to Dn, "not participating in communication" state is realized, where in such "not participating in communication", the content of the status signal of the equipment that is absent or in which communication failure, power disconnection, and the like occurred seen from the safety controller C0 conducting the interlock control becomes OFF ("0"), which corresponds to the "unsafe state", whereby the output of the multi-input logical product circuit AND configuring the interlock function incorporated in the user program becomes OFF ("0").

Then, similar to when one of the equipment D1 to Dn is in the "unsafe state", the content of the operation instruction signal received on each equipment side all becomes OFF ("0"), whereby all pieces of equipment D1 to Dn are in the "stopped state", and the entire manufacturing system is in the stopped state where the power supply is shielded.

SUMMARY

As described above, in the manufacturing system adopting a safety control system formed by connecting one safety master (safety controller C0) and a plurality of safety slaves (safety controller or safety remote I/O terminals C1 to Cn) by a safety field network, the entire manufacturing system is in a stopped state where a power supply is shielded, similar to when one of the equipment D1 to Dn is in an "unsafe state" in a state in which one of the equipment D1 to Dn configuring the manufacturing system is missing ("absent"), or in a state communication failure, power disconnection or the like occurred, that is, in a state of "not participating in communication" in which the relevant safety slave is not participating in the communication.

The state in which one of the equipment D1 to Dn configuring the manufacturing system is missing ("absent") occurs in newly setting a manufacturing system, in maintenance, and the like. In a case of the manufacturing system such as automobile and semiconductor, in particular, a supplier and an installing vendor of each equipment configuring the manufacturing system normally differ, and thus poses a problem in the operation test of each equipment and is extremely inconvenient if the operation of the entire manufacturing system cannot be executed unless all pieces of equipment are prepared.

In order to resolve the inconvenience that the operation of each equipment configuring the manufacturing system cannot be executed unless all pieces of equipment are prepared, some (first to third) interlock invalidation measures are being adopted from the related art (see FIGS. 13A to 13C).

As a first measure, a relevant location in the user program for realizing the interlock function is temporarily rewritten.

In other words, as is apparent from comparing an original program example shown in FIG. 13A and a program example after a change shown in FIG. 13B, a rewrite process of the user program in a safety controller C0 conducting the interlock function is performed using a predetermined programming tool in a first interlock invalidation measure to rewrite the program such that ON ("1") is constantly input instead of the status signal corresponding to the absent equipment (in this example, equipment D2) thereby temporarily eliminating an influence of the status signal OFF ("0") corresponding to the equipment D2.

As a second measure, the status signal to be input to the relevant location in the user program of the safety controller C0 conducting the interlock function or the operation instruction signal to be output to the relevant location is temporarily fixed at ON ("1") by a forced set function or a forced reset function equipped in the programming tool.

In other words, as is apparent from comparing the original program example shown in FIG. 13A and the program example after a change shown in FIG. 13C, the status signal (in this example, status signal corresponding to equipment D2) to be input to the relevant location in the user program for realizing the interlock function or the operation instruction signal (in this example, operation instruction signal output from the logical product circuit AND) to be output to the relevant location is temporarily fixed at ON ("1") by a forced set function or a forced reset function equipped in the programming tool using a predetermined programming tool in a second interlock invalidation measure to temporarily eliminate the influence of the status signal corresponding to the equipment D2.

As a third measure, an off-line simulation of the safety controller for executing a control to realize the interlock function is performed, and check of the system operation by the actual machine is not performed.

However, in the first measure, since the user program itself that is related to realization of the interlock function is changed, problems arise in that there is a possibility the program may be bugged in the changing operation, and the changed location may be forgotten to be returned to the original state. In particular, when the changed location in the user program is forgotten to be returned to the original state, an extremely dangerous matter may arise that the manufacturing system does not stop even if a safety device (e.g., emergency stop switch etc.) corresponding to the changed location is actuated.

In the second measure, since the status signal to be input to the relevant location in the user program of the safety controller C0 for realizing the interlock function and the operation instruction signal to be output to the relevant location is temporarily fixed by the forced set function or the forced reset function equipped in the programming tool, when attempting to forcibly operate the status signal or the operation instruction signal, a different signal may be forcibly operated by mistake, which may lead to an unexpected danger.

In the third measure, the program may be debugged, but since the check of the system operation by the actual machine including an externally connected device such as a sensor and a motor is not made, an unintended operation is assumed in the actual machine system, and safety cannot be sufficiently ensured.

The problems of the first to the third interlock invalidation measures are similarly assumed when using a building block type safety controller in stand alone and assigning each safety local I/O unit to each equipment of the manufacturing system.

Focusing on the problems of the related art, it is an object of the present invention to provide a safety controller of having the interlock in an invalid state with a simple operation without altering the user program itself, or forcibly setting or resetting the specific input signal or output signal when one of the equipment configuring the manufacturing system is "absent" or communication failure or power disconnection has occurred.

Another object of the present invention is to provide a safety controller capable of recovering the interlock to a valid state without requiring a special recovery operation when equipment that was "not participating in communication" participates in the communication and is "participating in communication".

Another further object of the present invention is to provide a safety controller for preventing, when equipment that was "not participating in communication" participates in the communication and is "participating in communication", the interlock from being invalidated by mistake thereafter.

Other objects and advantages of the present invention may be easily understood by those skilled in the art with reference to the following description of the specification.

The problems to be solved by the invention described above can be recognized as being solved by the safety master having the following configuration.

In other words, the safety mater of the present invention is configured to communicate with a plurality of safety slaves over a safety field network or with a plurality of safety local I/O units connected by a safety back plane bus of the safety master, wherein each of the plurality of safety slaves and safety local I/O units allow connection to safety I/O devices in a plurality of cell equipment.

The safety mater receives a status signal indicating a "safe state" or an "unsafe state" related to cell equipment from each safety slave or each safety local I/O unit, and controls operation/stop of the cell equipment by executing an interlock operation program arbitrarily created by a user with the received status signal as an input to output an operation instruction signal, and transmitting the operation instruction signal to the safety I/O device of each cell equipment via the safety slaves or the safety local I/O units to realize a safety control related to each cell equipment and a safety control for the entire series of cell equipment.

In the present invention, such safety mater includes an invalidation request generation unit for generating a status signal invalidation request including designation of any one of the cell equipment; and a status signal invalidation unit, arranged for each status signal of the plurality of cell equipment that becomes the input of the interlock operation program, for invalidating the status signal related to the cell equipment designated by the invalidation request when the status signal invalidation request is generated, so that when the safety slave or the safety local I/O unit corresponding to one of the cell equipment is "absent", or communication failure, power disconnection occurred thereat, an invalidation request for such cell equipment is generated to invalidate the status signal "unsafe state" of the relevant cell equipment so that influence of the "absent" safety slave or the safety local I/O unit on the entire equipment system through the execution of the interlock operation program can be avoided.

According to such configuration, if one of the equipment configuring the manufacturing system is "absent" or if communication failure, power disconnection has occurred, the interlock is made to an invalid state with a simple operation without altering the user program itself and without forcibly setting or resetting a specific input signal or an output signal, the interlock is avoided from acting due to absence of one part of the cell equipment so that the entire manufacturing system is in the stopped state, and furthermore, occurrence of unexpected abnormal operation due to mistaken operation in invalidating the interlock can be avoided, whereby operation test and the like of each equipment at the time of installing or maintenance of this type of manufacturing system can be smoothly carried out.

In a preferred embodiment of the present invention, a determining unit for determining whether the safety slave or the safety local I/O unit corresponding to each of the plurality of cell equipment is "participating in communication" or "not participating in communication" is further arranged; wherein the status signal invalidation unit invalidates the status signal of the cell equipment "not participating in communication" only if determined as "not participating in communication" by the determining unit, and cancels the invalidation of the status signal when the safety slave or the safety local I/O unit corresponding to the cell equipment "not participating in communication" is thereafter determined as "participating in communication".

According to such configuration, when the equipment that was "not participating in communication" up to then participates in the communication and is "participating in communication", the interlock is automatically recovered to a valid state without requiring a special recovery operation, and thus a state in which the interlock is not actuated even after the equipment participates due to forgetting of the recovery operation from the interlock invalid state can be avoided as much as possible.

In the preferred embodiment of the present invention, after the status signal invalidation unit once cancels the invalidation of the status signal, the status signal of the cell equipment "not participating in communication" is not again invalidated even if the safety slave or the safety local I/O unit, is again determined as "not participating in communication" by the determining unit.

According to such configuration, even if the interlock is attempted to be invalidated by mistake after one of the cell equipment participates in the system, such request cannot be accepted, and thus occurrence of abnormal operation by such mistaken operation can be avoided.

In the safety master according to the present invention, the "invalidation request generation unit" appropriately adopts that which (1) when one of a plurality of switches corresponding to each cell equipment connected to an input circuit of the safety master is operated, generates an invalidation request related to the status signal of the cell equipment corresponding to the switch; (2) when an address corresponding to the safety slave or the safety local I/O unit "not participating in communication" is notified by a predetermined operation at a programmable terminal, generates an invalidation request related to the status signal of the cell equipment corresponding to the address; (3) when notified that any one of the safety slaves and the safety local I/O units is "not participating in communication" through an internal communication unit registration table, generates an invalidation request related to the status signal of the cell equipment corresponding to the notification; simultaneously uses two or more of (1) to (3), and the like.

In a safety controller according to the present invention, the "determining unit" appropriately includes that which (1) determines a change from "not participating in communication" to "participating in communication" as a result of recovery of the communication with the safety slave or the safety local I/O unit on the cell equipment side; (2) determines a change from "not participating in communication" to "participating in communication" as a result of receiving valid I/O data from the safety slave or the safety local I/O unit on the cell equipment side; (3) determines a change from "not participating in communication" to "participating in communication" when an interlock condition is satisfied; and the like.

In a preferred embodiment, a display control unit for displaying a notice that an interlock is substantially invalidated on a predetermined display unit may be arranged in the safety controller according to the present invention.

According to such configuration, tests and checks at the time of start-up and maintenance of the system can be safely carried out with arbitrary cell equipment remaining in a state of "not participating in communication" by relying on the display.

Furthermore, in a preferred embodiment, a display control unit for displaying a notice of communication abnormality on a predetermined display unit only when an interlock is substantially not invalidated and when any one of the safety slaves and the safety local I/O units is "not participating in communication" may be arranged in the safety controller according to the present invention.

According to such configuration, a trouble from the display of notice of communication abnormality at the point of performing the test task, the check task, and the like with one of the cell equipment remaining in the state of "not participating in communication" and the interlock invalidated can be avoided.

BRIEF DESCRIPTION OF THE DRAWINGS

FIGS. 12A and 12B show explanatory views of a safety measure of each equipment and a safety measure for the entire manufacturing system.

DETAILED DESCRIPTION

One preferred embodiment of a safety master according to the present invention will be described in detail with reference to the accompanying drawings.

Figure 1A:
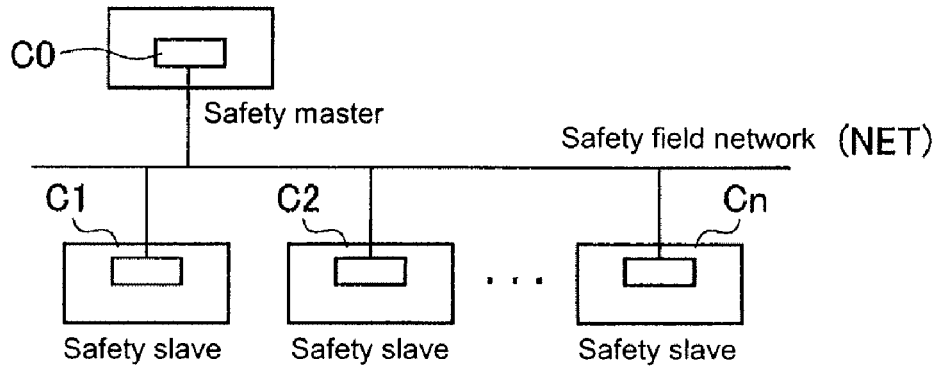
FIGS. 1A to 1D are explanatory views showing a system configuration example applied with the present invention.
Figure 1B:
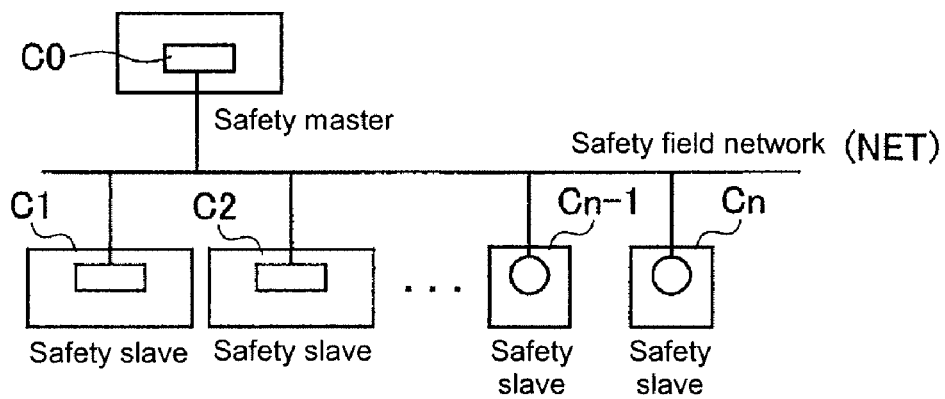
Figure 1C:
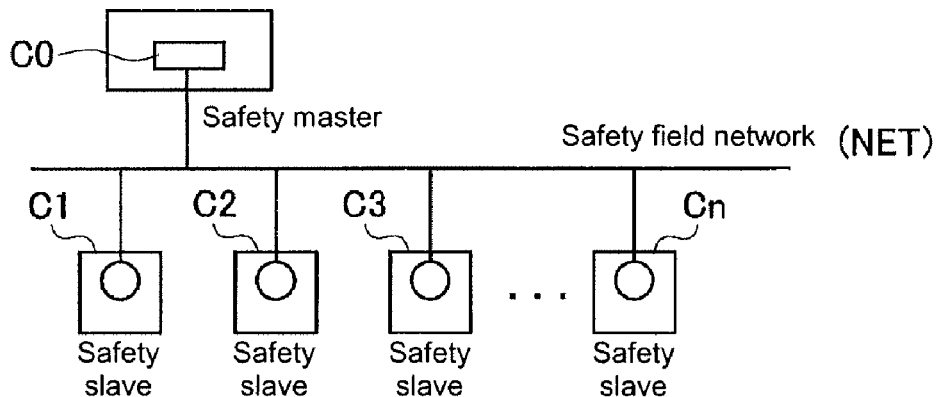
Figure 1D:
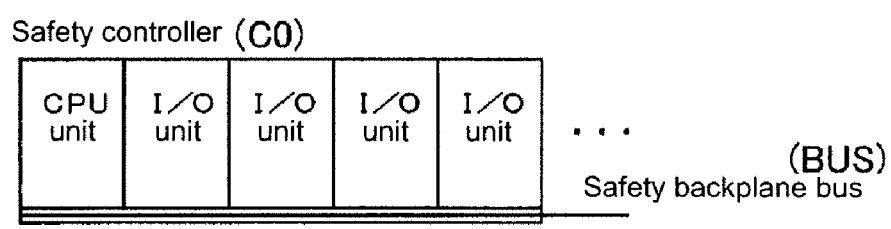

Explanatory views each showing a system configuration example applied with a safety master according to the present invention are shown in FIGS. 1A to 1D. A safety master C0 according to the present invention is connected to a safety I/O device in a plurality of cell equipment configuring one equipment system by way of each of a plurality of safety slaves C1 to Cn connected by a safety field network (NET), as shown in FIGS. 1A to 1C, or by way of each of a plurality of local I/O units connected by a safety backplane bus (BUS), as shown in FIG. 1D.

More specifically, FIG. 1A shows an example in which a safety controller (rectangular symbol in the figure) is adopted for all the safety slaves C1, C2, . . . , Cn, FIG. 1B shows an example in which the safety controller (rectangular symbol in the figure) and the safety remote I/O terminal (circular symbol in the figure) coexist, and FIG. 1C shows an example in which the safety remote I/O terminal (circular symbol in the figure) is adopted for all the safety slaves C1, C2, . . . , Cn.

A status signal indicating whether a safety input/output device in the cell equipment under the jurisdiction of the slave is in a "safe state" or an "unsafe state" is generated from each safety slave C1, C2, . . . , Cn, and such status signal is transmitted to the safety master C0 through the safety field network.

In the example shown in FIG. 1D, a backplane bus (BUS) is arranged on a rigid plate called a backplane and a unit attachment connector is arrayed at an appropriate interval on the backplane bus (BUS), which is attached with one CPU unit and a plurality of safety local I/O units to configure a building block type safety controller, where each of the plurality of safety local I/O units is connected to an input/output safety device in each cell equipment configuring the manufacturing system.

A status signal indicating whether a safety input/output device in the cell equipment under the jurisdiction of the slave is in a "safe state" or an "unsafe state" is generated from each safety local I/O unit, and such status signal is transmitted to the CPU unit functioning as a safety master through the backplane bus (BUS).

The safety remote I/O terminal executes operations such as transmitting output data received from the safety master through communication to a safety output device via an output circuit (not shown) and transmitting input data retrieved from a safety input circuit to the safety master through communication.

Figure 2:
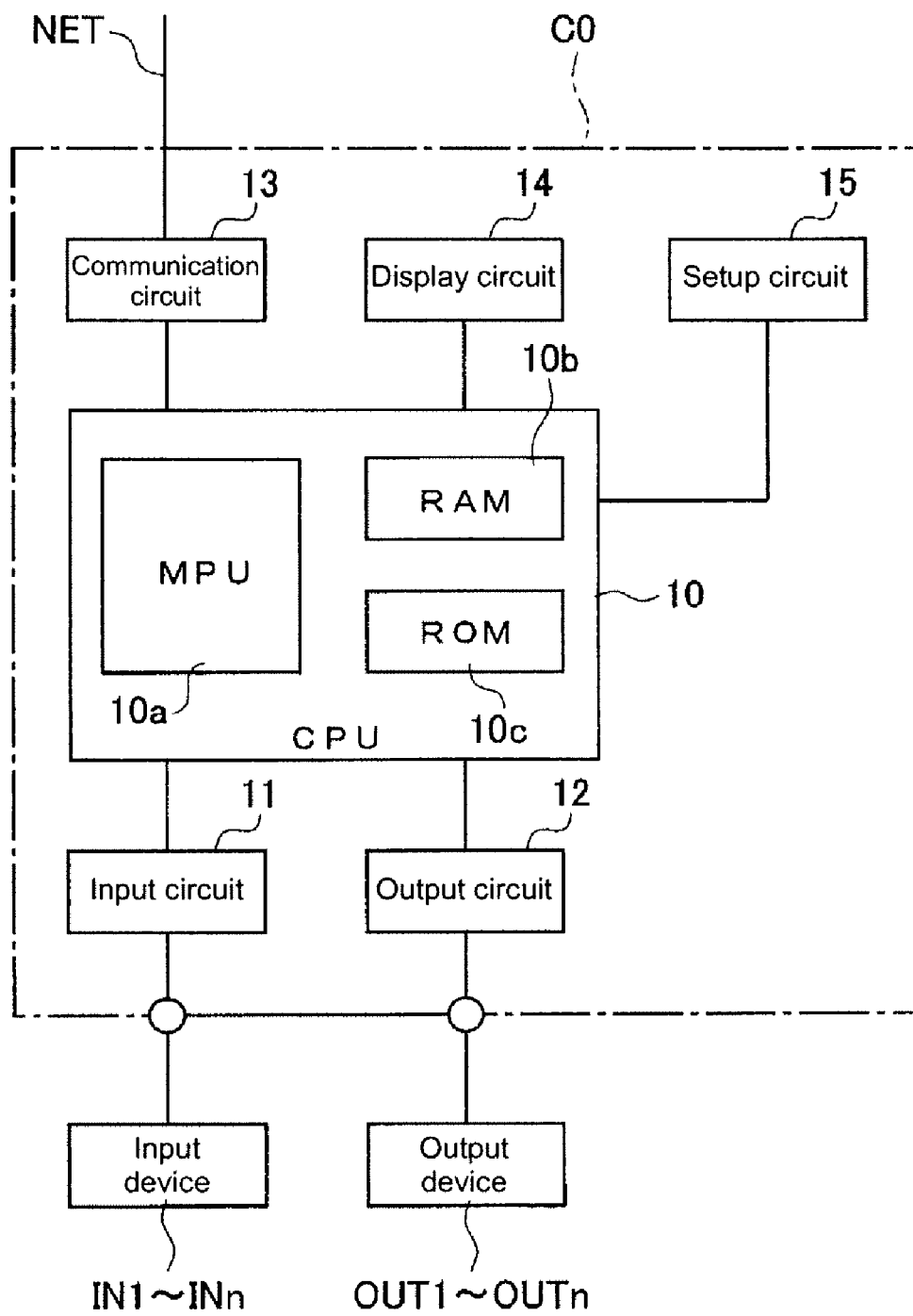
FIG. 2 shows a hardware configuration diagram of a safety controller (safety master)

A hardware configuration diagram showing a schematic configuration of the safety controller C0 functioning as the safety master is shown in FIG. 2. As shown in the figure, the safety controller C0 is connected to the safety field network (NET) by way of a communication circuit 13, and also connected to input devices IN1 to INn adapted to a predetermined safety standard by way of an input circuit 11 and to output devices OUT1 to OUTn adapted to a predetermined safety standard by way of an output circuit 12.

The safety controller C0 internally includes a CPU 10 for collectively controlling the input circuit 11, the output circuit 12, the communication circuit 13, a display circuit 14, and a setup circuit 15. Here, the display circuit 14 is provided to perform various types of displays related to the operation of the safety controller, and is configured by a liquid crystal display of an appropriate size, an operation display lamp, and the like. The setup circuit 15 is provided to perform various setups related to the operation of the safety controller, and is configured by a ten key, a function key, a key switch, and the like.

The CPU 10 includes a microprocessor (MPU) 10a, a RAM 10b, and a ROM 10c. As hereinafter described, the microprocessor (MPU) 10a, the RAM 10b, and the ROM 1c are duplicated to guarantee operational reliability.

Figure 3:
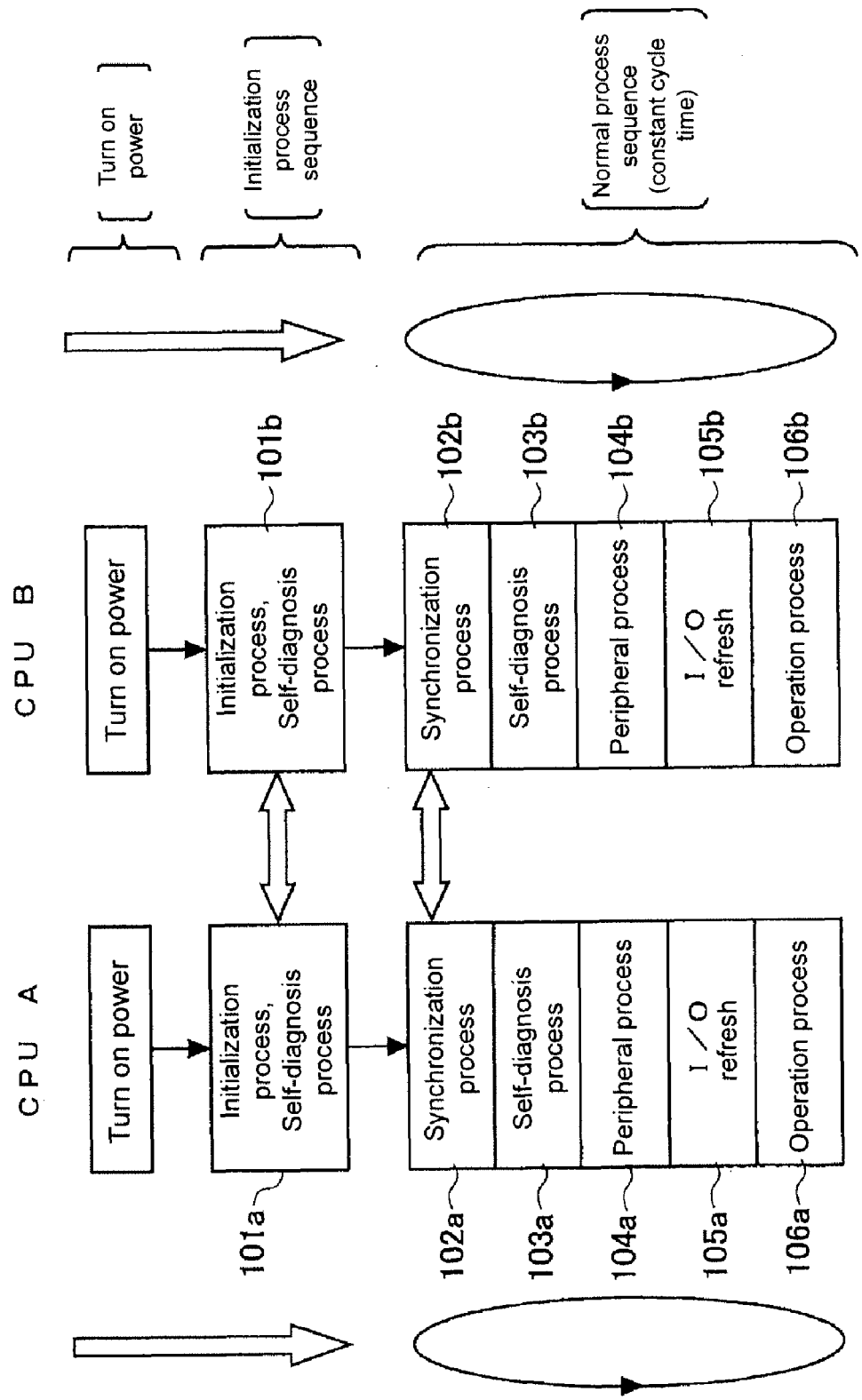
FIG. 3 is a general flowchart showing an overall process of the safety controller (safety master)

A general flowchart showing an overall process of the CPU in the safety controller functioning as the safety master is shown in FIG. 3. As shown in the figure, the entire CPU 10 is configured by two CPUs (CPU A, CPU B), which CPUs are configured to operate in parallel while synchronizing, and to simultaneously execute in parallel, immediately after turning ON the power, an initialization process, a self-diagnosis process (steps 101a, 101b), and subsequently, a synchronization process (steps 102a, 102b), a self-diagnosis process (steps 103a, 103b), a peripheral process (steps 104a, 104b), an I/O refresh process (steps 105a, 105b), and an operation process (steps 106a, 106b).

The "initialization process" herein is a process of initializing a device and data, reading out stored data, and the like; and the "self-diagnosis process" is a process of performing hardware diagnosis (steps 101a, 101b). The "synchronization process" (steps 102a, 102b) is a process of performing temporal synchronization process (including Wait process for making the cycle time constant), data match checking process, and the like between the two CPUs. The self-diagnosis process (steps 103a, 103b) is a process of performing hardware diagnosis and the like. The peripheral process (steps 104a, 104b) is a process of performing access process on an external media (memory card, RTC, etc.), communication process with an external device, a tool, and the like. The I/O refresh process (steps 105a, 105b) is a process of performing update process of a local input/output (including input/output unit), data update of a remote I/O input/output, and the like. Furthermore, the operation process (steps 106a, 106b) is a process of executing a user program (including the user program for realizing interlock function) arbitrarily created by the user.

Figure 4:
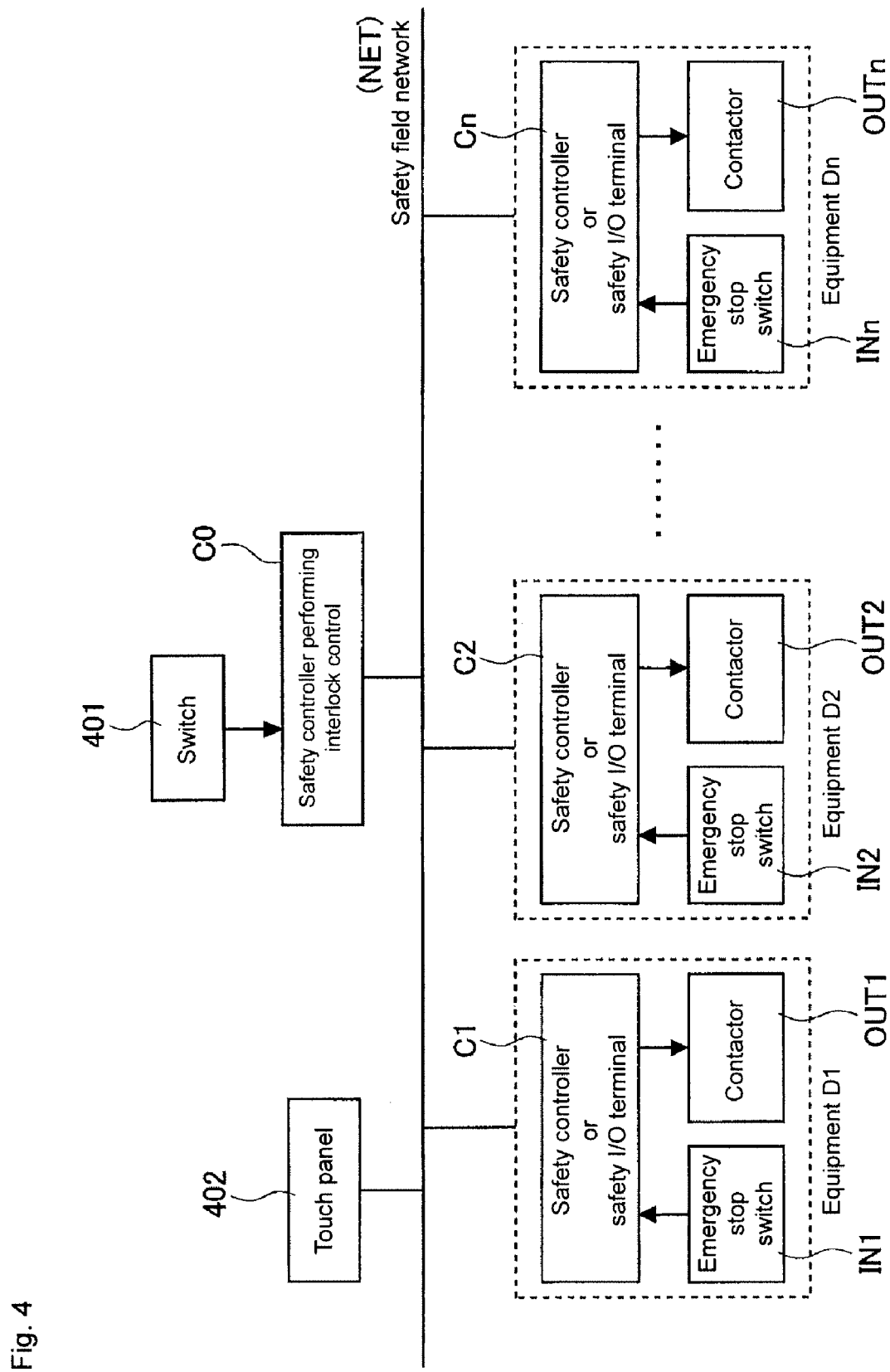
FIG. 4 shows a configuration view of an entire safety control system including the safety controller (safety master)

A more detailed configuration view of the entire safety control system including the safety controller C0 functioning as the safety master according to the present invention is shown in FIG. 4. As shown in the figure, the safety control system includes one safety controller C0 for performing the interlock control, and a plurality of safety slaves C1 to Cn.

The manufacturing system for exercising control over the safety control system is configured to include n cell equipment. Each of the n safety slaves C1 to Cn is configured to exercise control over each of the n cell equipment D1 to Dn.

More specifically, each of the n cell equipment D1 to Dn includes the safety slave C1 to Cn, and such safety slave C1 to Cn is configured to handle the input devices IN1 to INn adapted to a predetermined safety standard, and the output devices OUT1 to OUTn adapted to a predetermined safety standard.

In each cell equipment D1 to Dn, when an "unsafe state" related to the relevant equipment is determined through the input devices IN1 to INn adapted to a predetermined safety standard, and the output devices OUT1 to OUTn adapted to a predetermined safety standard, the status signal of such notice is transmitted to the safety controller C0 performing the interlock control through the safety field network (NET).

The safety controller C0 for performing the interlock control is incorporated with a user program for realizing the interlock function thereafter represented by the multi-input logical product circuit AND, and the like. The user program is executed based on the status signal transmitted from each of the plurality of equipment D1 to Dn, and designed to generate an operation instruction signal instructing either operation instruction or stop instruction.

The safety controller C0 for performing the interlock control is internally arranged with an invalidation request generation unit for generating a status signal invalidation request including designation of the cell equipment D1 to Dn, and a status signal invalidation unit, arranged for every status signal of each cell equipment D1 to Dn that becomes the input of the interlock operation program, for invalidating the status signal related to the cell equipment designated by the invalidation request when the status signal invalidation request is generated.

Here, the "invalidation request generation unit" may appropriately use that which (1) when one of a plurality of switches 401 corresponding to each cell equipment connected to the input circuit is operated, the invalidation request related to the status signal of the cell equipment corresponding to the switch 401 is generated; (2) when an address corresponding to the safety slave or the safety local I/O unit "not participating in communication" due to "absent", communication failure, and the like is notified by a predetermined operation at a touch panel 402 of a programmable terminal, the invalidation request related to the status signal of the cell equipment corresponding to the address is generated; (3) when notice is made that any one of the safety slaves C1 to Cn (or safety local I/O units) is "not participating in communication" through an internal communication unit registration table, the invalidation request related to the status signal of the cell equipment corresponding thereto is generated; or two or more of (1) to (3).

Various configurations shown in FIGS. 7 to 11 may be adopted for the "status signal invalidation unit". In other words, the status signal invalidation unit is arranged for every status signal of each cell equipment D1 to Dn that becomes the input of the interlock operation program, and invalidates the status signal related to the cell equipment designated by the invalidation request when the status signal invalidation request is generated.

As described above, the safety controller (i.e., "safety master") C0 for performing the interlock control includes the "invalidation request generation unit" and the "status signal invalidation unit" having the above function, and thus when one of the cell equipment D1 to Dn is "not participating in communication" due to absence and the like at the start of newly creating the system, the status signal invalidation request designating the relevant cell equipment is generated, so that the status signal related to the designated cell equipment is invalidated as hereinafter described. As a result, the interlock substantially does not act on the relevant cell equipment, whereby problems do not arise in the operation of other cell equipment, and check, inspection and the like before start-up can be carried out without any problem even if the relevant cell equipment is "not participating in communication" due to absence, communication failure, and the like.

Figure 5:
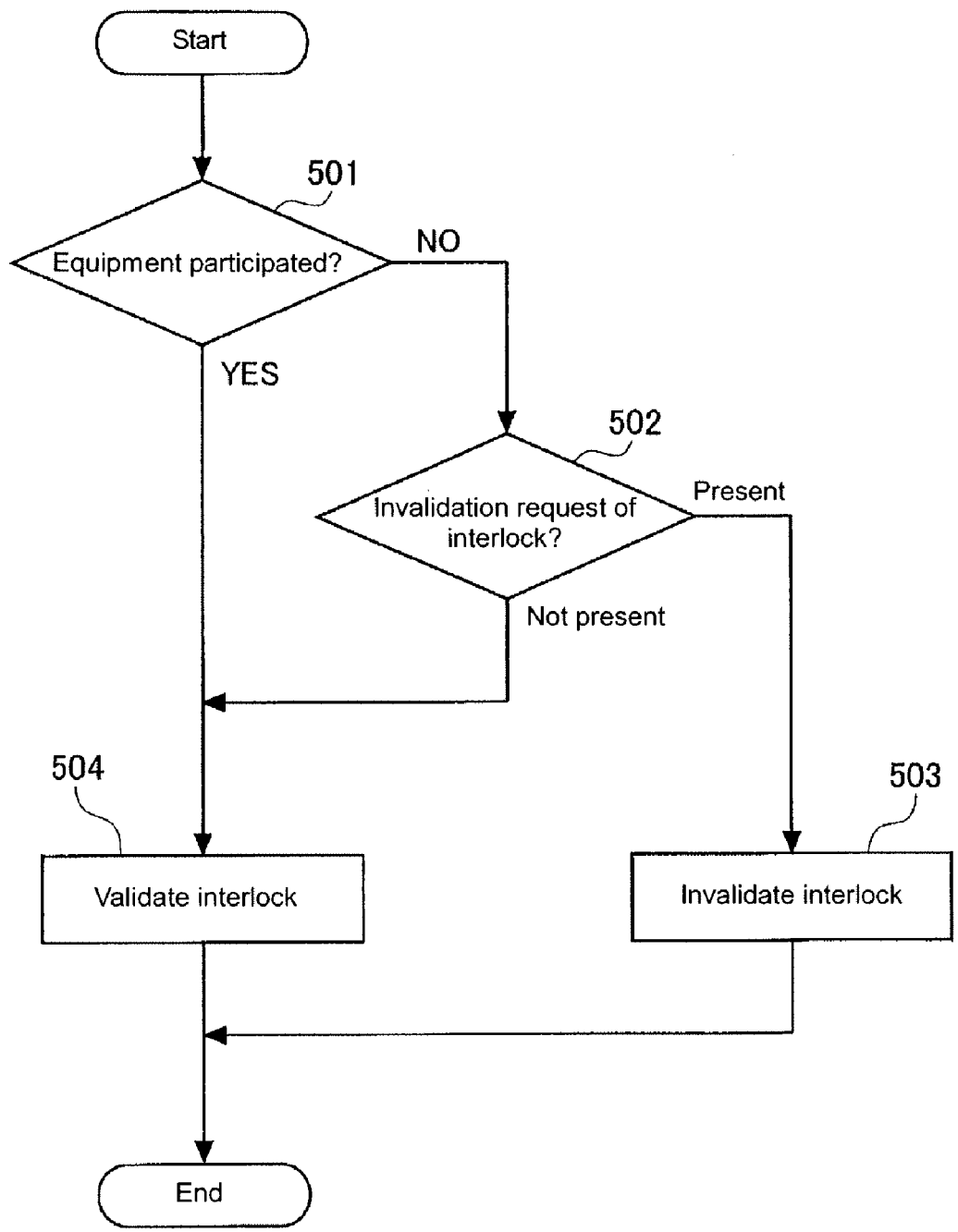
FIG. 5 shows an operation explanatory view related to equipment Dn of a safety controller (safety master) C0 according to the present invention.

An operation explanatory view related to the equipment Dn of the safety controller (safety master) C0 according to the present invention is shown in FIG. 5. As shown in the figure, suppose a process shown in a flowchart of FIG. 5 is activated when the safety slave Cn related to the equipment Dn is in an "absent" state due to start-up and the like of the system, the equipment Dn is determined as "not participating" (NO in step 501), and the presence of the invalidation request of the interlock is determined (step 502). Here, if determined that the invalidation request of the interlock (meaning invalidation request of status signal) is "not present" (No in step 502), the interlock is validated (step 504), whereby the interlock function (e.g., in a case of multi-input logical product circuit AND) is activated, and all pieces of the equipment D1 to Dn will be in the stopped state.

When the equipment is in the state of "not participating" (NO in step 501), and determination is made that the interlock invalidation request is present (YES in step 502), the interlock is invalidated (step 503), and thus all pieces of the equipment D1 to Dn will be in the operation state.

Figure 6:
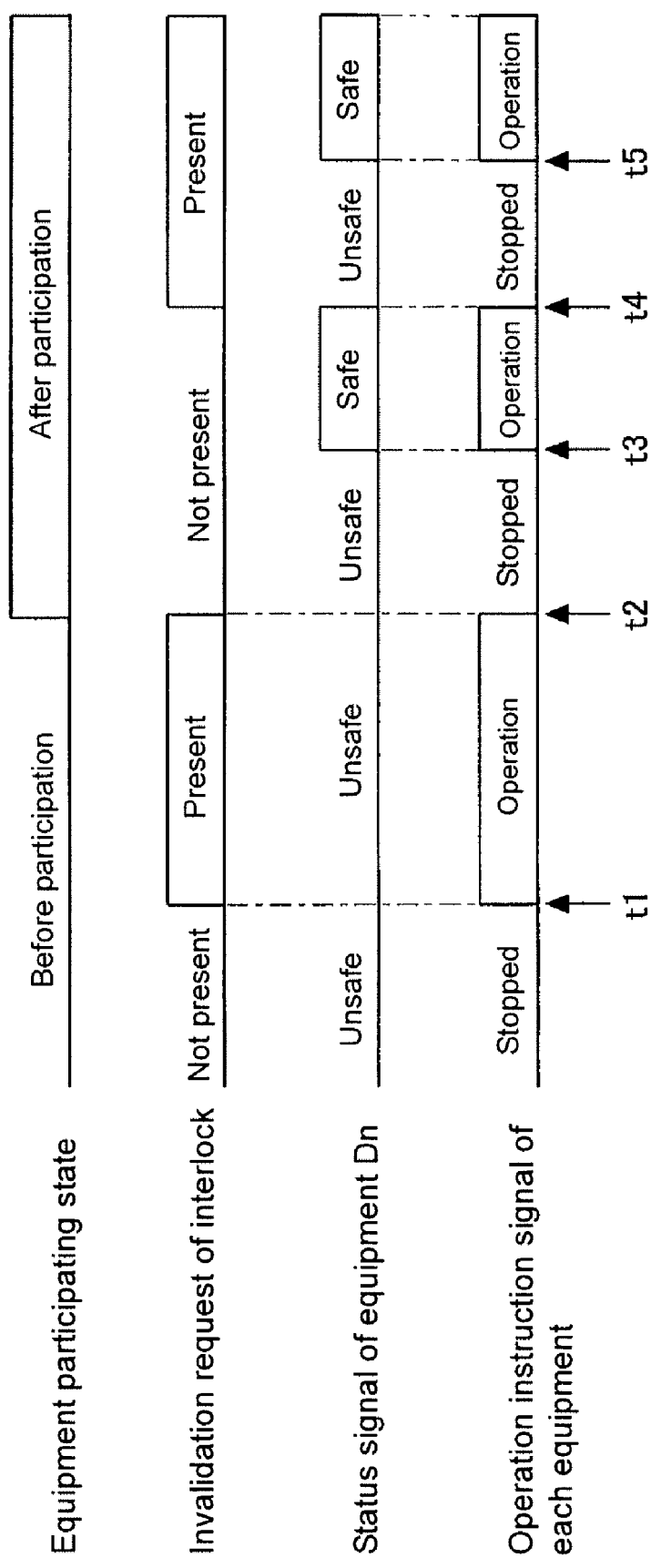
FIG. 6 is a time chart showing an operation of the safety controller (safety master) C0 according to the present invention.

A time chart showing the operation of the safety controller (safety master) C0 according to the present invention is shown in FIG. 6. As shown in the figure, the period from time 0 to time t1 is when the safety slave Cn is in the "not participating in communication" state (e.g., "absent" or "communication failure"), and thus the status signal of the equipment Dn is turned OFF ("0"), which indicates an "unsafe state", the operation instruction signal of each equipment becomes "0", which indicates "stop instruction", by the execution of the interlock program, and all pieces of equipment will be in the stopped state.

When the interlock invalidation request is generated at a time point of time t1, the status signal of the equipment Dn of "0" is invalidated and becomes "1", and the operation instruction signal of each equipment becomes "1" indicating "operation instruction" by the execution of the interlock program, and all pieces of the equipment will be in the operation state.

When the equipment Dn is in the "participating in communication" state (e.g., "present" or "recovery of communication failure") and the interlock invalidation request is not present at the time point of time t2, the operation instruction signal of each equipment becomes "0" indicating "stop instruction" if the content of the status signal of the equipment Dn is an "unsafe state" (t2 to t3), and the operation instruction signal of each equipment becomes "1" indicating "operation instruction" if the content of the status signal of the equipment Dn is a "safe state" (t3 to t4).

Similar to a situation where the interlock invalidation request is not present, when the interlock invalidation request is generated at the time point of time t4, the operation instruction signal of each equipment becomes "0" indicating "stop instruction" if the content of the status signal of the equipment Dn is an "unsafe state" (t4 to t5), and the operation instruction signal of each equipment becomes "1" indicating "operation instruction" if the content of the status signal of the equipment Dn is a "safe state" (t5-).

Figure 7A:
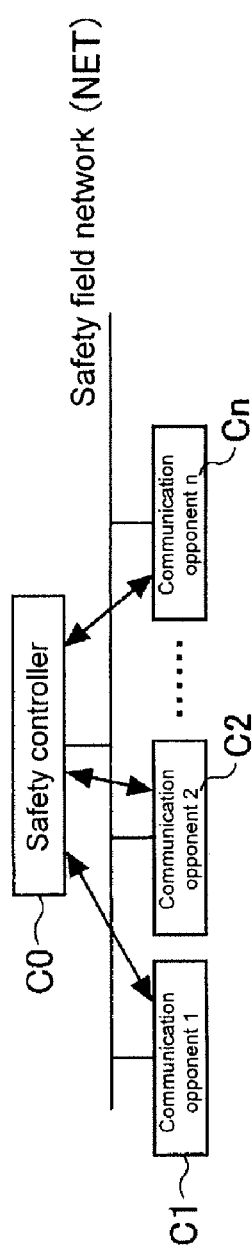
FIGS. 7A to 7C show explanatory views of a status signal invalidation unit (No. 1) according to the present invention.
Figure 7B:
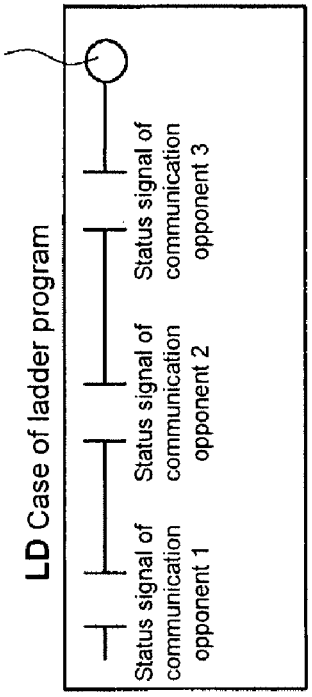
Figure 7C:
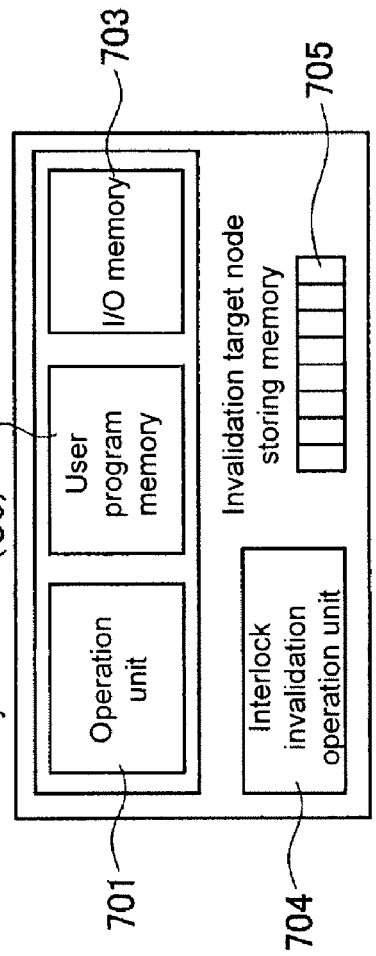

Explanatory views of a status signal invalidation unit (No. 1) according to the present invention are shown in FIGS. 7A to 7C. The illustrated "status signal invalidation unit" has the user program itself similar to the normal interlock circuit regardless of whether invalidating the interlock or not, and the safety controller has a dedicated interlock invalidation (determination) unit separate from the user program execution unit. In the description of FIGS. 7 to 11, the "safety slave" is described as "communication opponent", but the entity thereof is the same.

In FIGS. 7A to 7C, an operation unit 701 has a function of executing the user program, and includes a basic command and an application command for execution. A user program memory 702 is stored with a user program arbitrarily created by the user. An I/O memory 703 is stored with input data and output data of the user program. An interlock invalidation operation unit 704 is incorporated with a function built in hardware or software. An invalidation target node storing memory 705 is stored with information (e.g., node address, etc.) for specifying the communication opponent for invalidating the interlock. It is automatically determined that manual setup or communication by the user is not made, and the safety controller is setup.

Figure 8A:
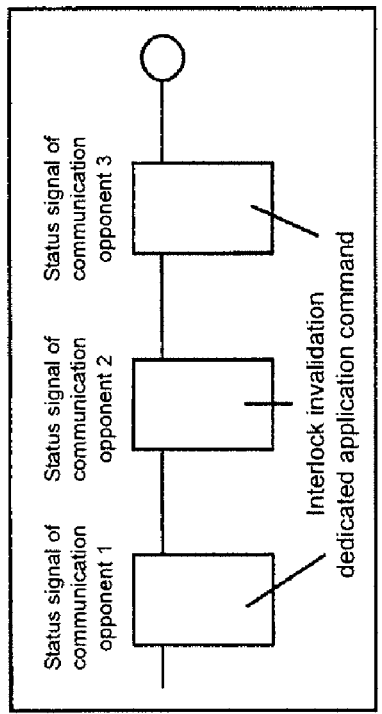
FIGS. 8A and 8B show explanatory views of a status signal invalidation unit (No. 2) according to the present invention.
Figure 8B:
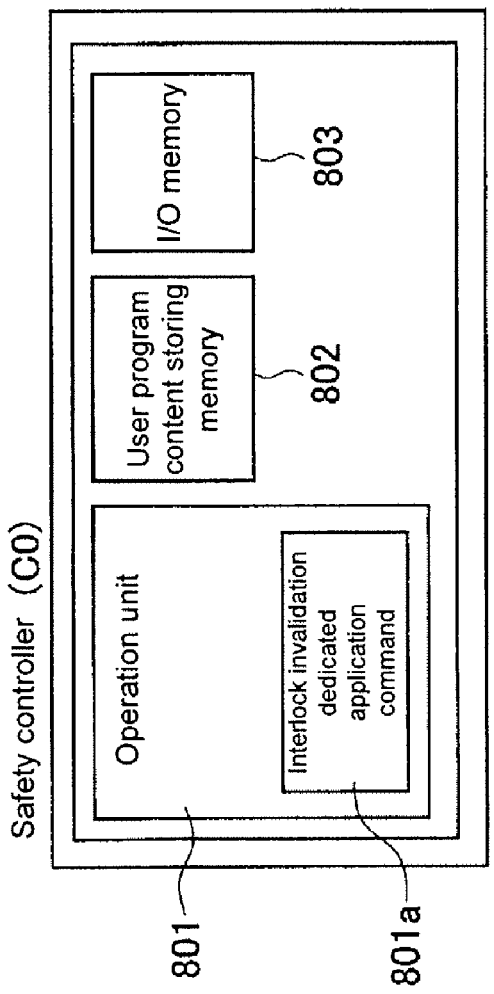

Explanatory views of a status signal invalidation unit (No. 2) according to the present invention are shown in FIGS. 8A and 8B. The "status signal invalidation unit" illustrated herein is clearly arranged with an application command and application function block at the portion of invalidating the interlock on the user program, and the safety controller has a function of executing such application command and application function block.

In FIGS. 8A and 8B, an operation unit 801 has a function of executing the user program, and includes a basic command and an application command for execution. An interlock invalidation dedicated application command 801*a* is incorporated with a dedicated application command and an application FB for invalidating the interlock. The programming tool can use such dedicated application command and application FB.

Figure 9A:
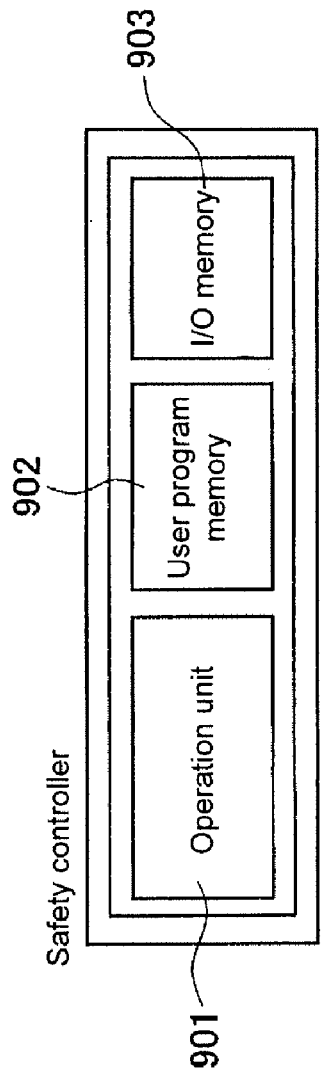
FIGS. 9A and 9B show explanatory views of a status signal invalidation unit (No. 3) according to the present invention.
Figure 9B:
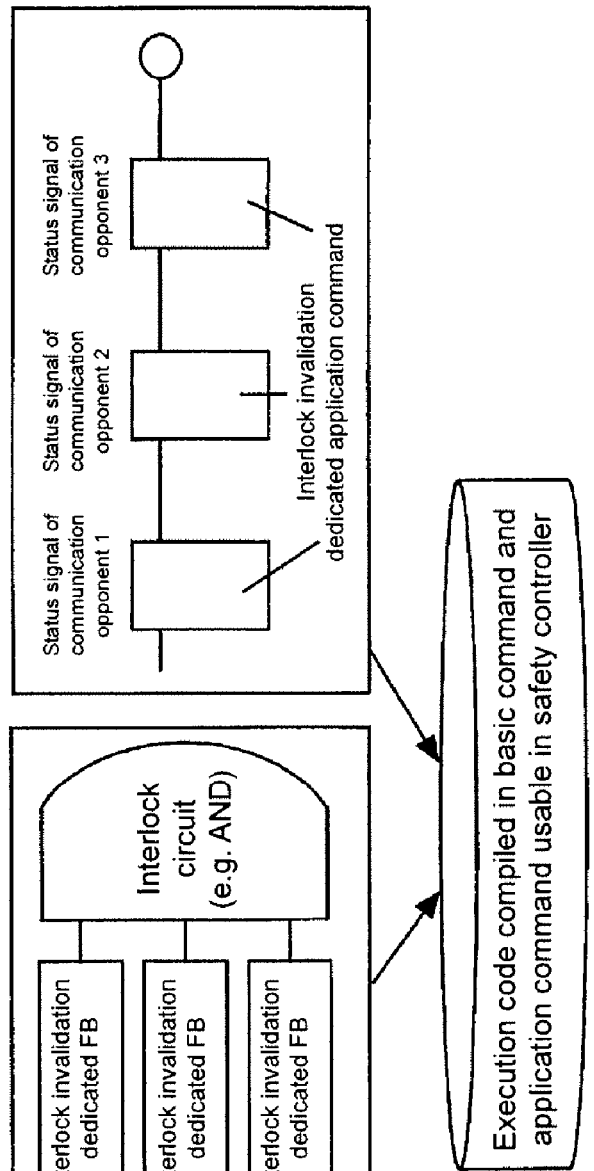

Explanatory views of a status signal invalidation unit (No. 3) according to the present invention are shown in FIGS. 9A and 9B. In the illustrated "status signal invalidation unit", the safety controller does not have the dedicated application command and the dedicated application FB for invalidating the interlock. This safety controller depends on the programming tool used simultaneously for its role. That is, in the examples of FIGS. 9A and 9B, the user uses the programming tool capable of using the dedicated application command and the application FB for invalidating the interlock to build the invalidation program.

In FIGS. 9A and 9B, an operation unit 901 has a function of executing the user program, and includes a basic command and an application command for execution. A user program memory 902 is stored with a user program. An I/O memory 903 is stored with input data and output data of the user program.

Figure 10:
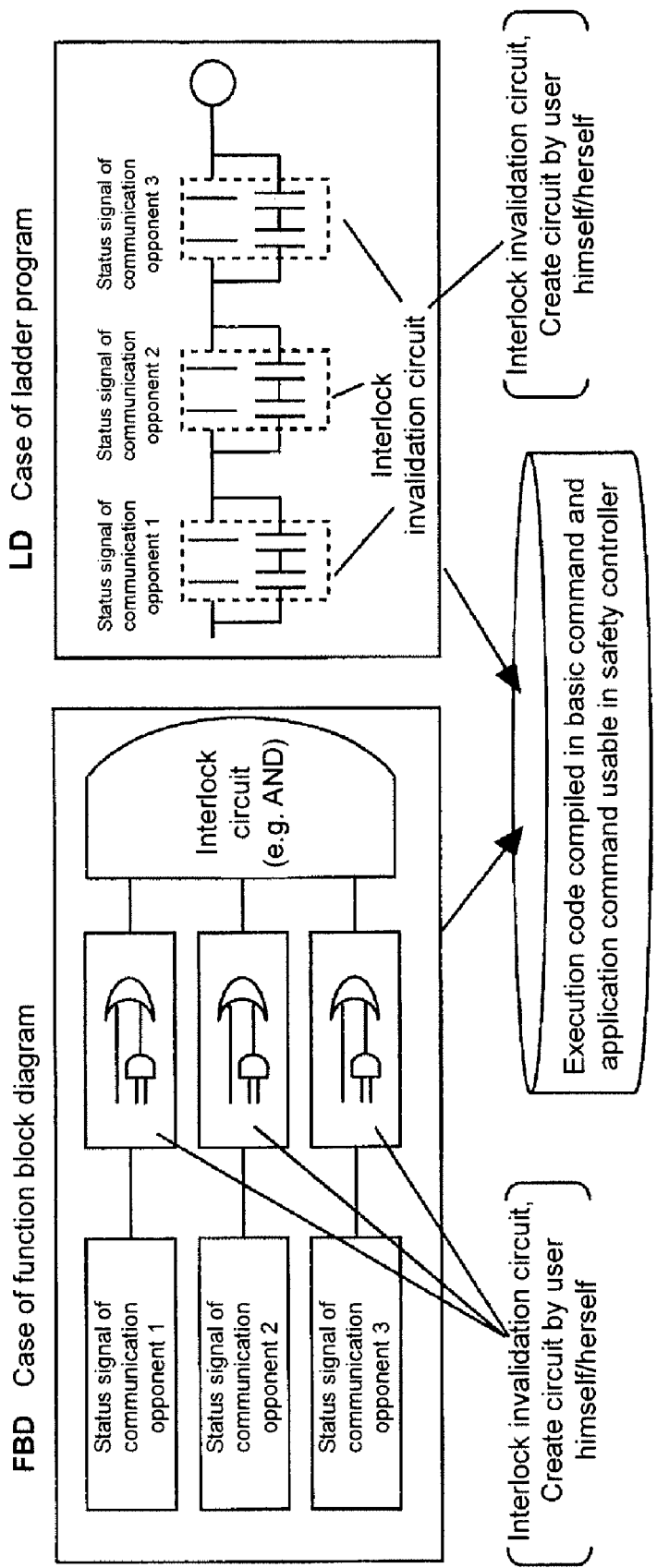
FIG. 10 shows an explanatory view of a status signal invalidation unit (No. 4) according to the present invention.

An explanatory view of a status signal invalidation unit (No. 4) according to the present invention is shown in FIG. 10. In the illustrated "status signal invalidation unit", the safety controller does not have the dedicated application command and the dedicated application FB for invalidating the interlock. This safety controller depends on the programming tool used simultaneously for its role. That is, in the example of FIG. 10, the user uses the programming tool not having the dedicated application command and the application FB for invalidating the interlock to build the invalidation program.

Figure 11A:
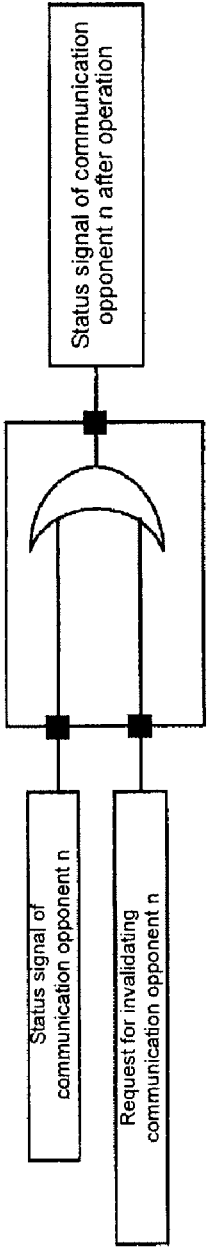
FIGS. 11A to 11D show detailed explanatory views of the status signal invalidation circuit.

Detailed explanatory views of the status signal invalidation circuit are shown in FIGS. 11A to 11D. As shown in FIG. 11A, the status signal invalidation circuit can be easily built using a logical sum operator, but in a case of the status signal invalidation circuit merely using the logical sum operator, the interlock may be invalidated if the "request for invalidating the communication opponent n" is mistakenly turned ON even if the communication opponent n is normally participated and is performing communication with the safety controller. The "request for invalidating the communication opponent n" may be mistakenly turned ON by an operation mistake of the operator, a noise in the communication path, and the like.

Figure 11B:
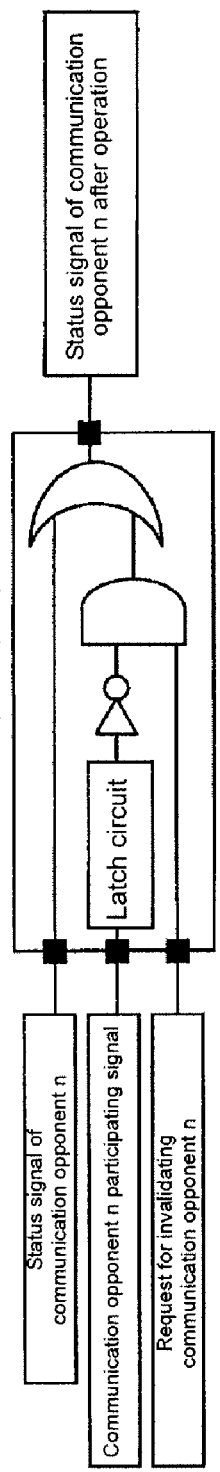

According to the interlock invalidation circuit (No. 1) of the present invention shown in FIG. 11B, a method of inputting the request for invalidating the communication opponent n to one of the two input logical product operator, and inserting a latch circuit and an inverted operator in series to the other input is adopted, and thus once the communication opponent n participates, the invalidation of the interlock is disabled thereafter, and thus safety similar to when invalidation is not performed can be maintained.

Figure 11C:
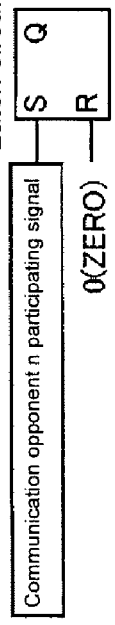

The latch circuit in FIG. 11B can be built using an RS flip-flop circuit shown in FIG. 11C. In this case, "0" is preferably constantly provided to a reset input terminal so as not to be carelessly reset.

Figure 11D:
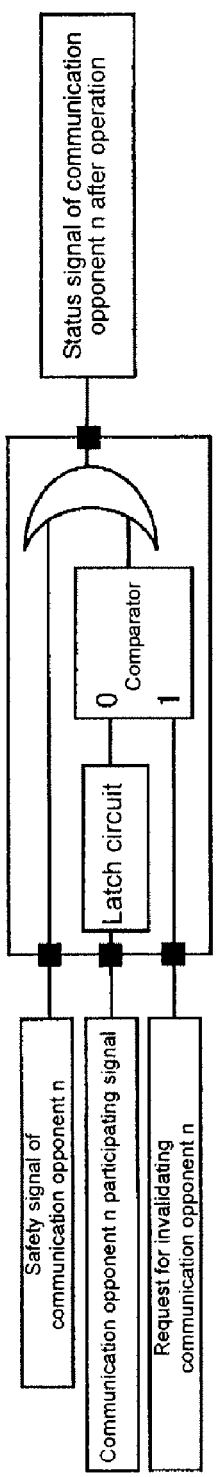
Figure 13A:
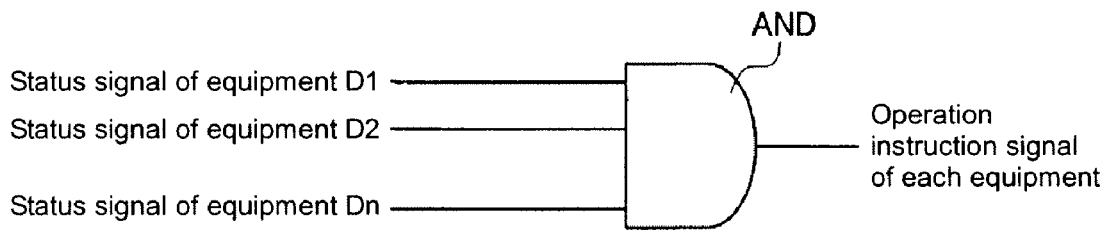
FIGS. 13A to 13C show explanatory views of conventional interlock invalidation measures.
Figure 13B:
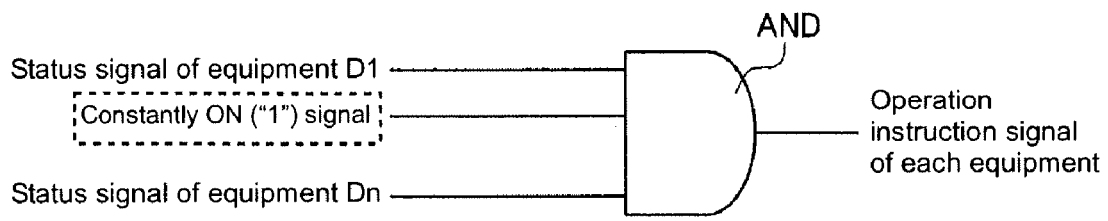
Figure 13C:
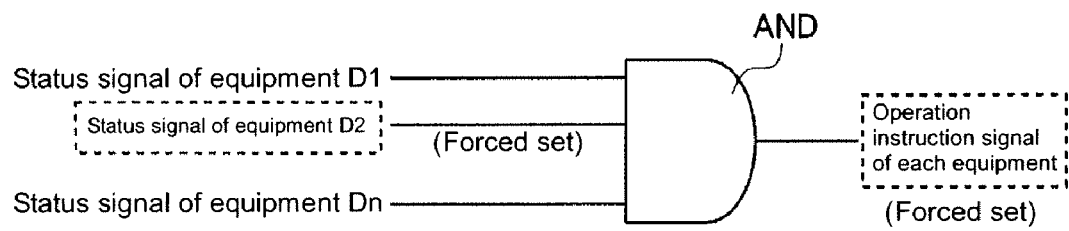

The portion of "latch circuit to AND" in the circuit of FIG. 11B can be realized using a comparator and the like as shown in FIG. 11D.

The "communication opponent n participating signal" is generated by one of the following signals, or a combination thereof.

Safety controller starts to communicate with the communication opponent n

This can be realized by, for example, constantly receiving the ON signal from the communication opponent. The signal appears to be turned OFF before the start of communication, but is constantly an ON signal at the establishment of the communication.

Receive valid I/O data.

This can be realized by also receiving a flag indicating whether the I/O data is valid or invalid from the communication opponent.

Interlock condition satisfied.

This can be realized by, for example, determining whether the "safety signal of the communication opponent" is turned ON.

The "request for invalidating the communication opponent n" can be generated by one of the following signals or a combination thereof.

Notify invalidation of interlock with ON/OFF of the switch connected to the input circuit of the safety controller for performing interlock control.

Specify an address of the non-participating communication opponent with a programmable display unit (also referred to as programmable terminal), and notify to the safety controller performing interlock control through the network.

Automatically judge the communication opponent to invalidate by the communication unit registration table in the safety controller.

In the above embodiment, the notice that the interlock is substantially invalidated is displayed on the predetermined display unit, so that tests and checks at the time of start-up and maintenance of the system can be safely carried out relying on such display with arbitrary cell equipment not participating in the communication.

Furthermore, a display control unit for displaying a notice of communication abnormality on a predetermined display unit when the interlock is not substantially invalidated, and any one of the safety slaves and the safety local I/O units is "not participating in communication" may be arranged. According to such configuration, the trouble from the display of notice of communication abnormality at the point of performing the test task, the check task, and the like with one of the cell equipment "not participating in communication" and the interlock invalidated can be avoided.

According to the safety master of the present invention, when one of the equipment configuring the manufacturing system is absent, or communication failure or power disconnection has occurred, the manufacturing system is avoided from being in the stopped state with the interlock in the invalid state without altering the user program itself related to the relevant equipment or forcibly setting or resetting the specific input signal or the output signal, and furthermore, when the equipment that was absent participates, the interlock recovers to a valid state without requiring a special recovery operation, whereby a state in which the interlock is not actuated even after the equipment participates due to occurrence of unexpected abnormality operation from mistaken operation in invalidating the interlock and forgetting of recovery from the interlock invalid state can be avoided as much as possible.

What is claimed is:

1. A safety master configured to communicate with a plurality of safety slaves over a safety field network or with a plurality of safety local I/O units connected by a safety back plane bus of the safety master, wherein each of the plurality of safety slaves and safety local I/O units allow connection to safety I/O devices in a plurality of cell equipment, and wherein the safety master receives a status signal indicating a "safe state" or an "unsafe state" related to cell equipment from each of the corresponding plurality of safety slaves or safety local I/O units, and controls operation/stop of cell equipment by executing an interlock operation program with the received status signal as an input to output an operation instruction signal, and transmitting the operation instruction signal to the safety slaves or safety local I/O units to realize a safety control related to each of the plurality of cell equipment and the entire series of cell equipment; the safety master comprising:

an invalidation request generation unit for generating a status signal invalidation request including designation of any one of the cell equipment; and a status signal invalidation unit, arranged for each status signal of the plurality of cell equipment that becomes the input of the interlock operation program, for invalidating the status signal related to the cell equipment designated by the invalidation request when the status signal invalidation request is generated.

2. The safety master according to claim 1, further comprising a determining unit for determining whether the safety slave or the safety local I/O unit corresponding to each of the plurality of cell equipment is "participating in communication" or "not participating in communication"; wherein the status signal invalidation unit is configured to invalidate the status signal of the cell equipment related to "not participating in communication" only if determined as "not participating in communication" by the determining unit, and is configured to cancel the invalidation of the status signal when the safety slave or the safety local I/O unit corresponding to the cell equipment related to "not participating in communication" is thereafter determined as "participating in communication".

3. The safety master according to claim 2, wherein after the status signal invalidation unit once cancels the invalidation of the status signal, the status signal of the cell equipment related to "not participating in communication" is not again invalidated even if the safety slave or the safety local I/O unit is again determined as "not participating in communication" by the determining unit.

4. The safety master according to claim 2, wherein the determining unit is configured to determine a change from "not participating in communication" to "participating in communication" as a result of recovery of the communication with the safety slave or the safety local I/O unit.

5. The safety master according to claim 2, wherein the determining unit is configured to determine a change from "not participating in communication" to "participating in communication" as a result of receiving valid I/O data from the safety salve or the safety local I/O unit.

6. The safety master according to claim 2, wherein the determining unit is configured to determine a change from "not participating in communication" to "participating in communication" when an interlock condition is satisfied.

7. The safety master according to claim 1, wherein the invalidation request generation unit is configured so that when one of a plurality of switches corresponding to cell equipment connected to an input circuit of the safety master is operated, the invalidation request generation unit generates an invalidation request related to the status signal of the cell equipment corresponding to the switch.

8. The safety master according to claim 1, wherein invalidation request generation unit is configured so that when an address corresponding to the safety slave or the safety local I/O unit related to "not participating in communication" is notified by a predetermined operation at a programmable terminal connected to the network, the invalidation request generation unit generates an invalidation request related to the status signal of the cell equipment corresponding to the address.

9. The safety master according to claim 1, wherein invalidation request generation unit is configured so that when notified of "not participating in communication" of any one of the safety slaves and the safety local I/O units through a communication unit registration table in the safety master, the invalidation request generation unit generates an invalidation request related to the status signal of the cell equipment corresponding to the notification.

10. The safety master according to claim 1, further comprising a display control unit for displaying a notice that an interlock is invalidated on a predetermined display unit.

11. The safety master according to claim 1, further comprising a display control unit for displaying a notice of communication abnormality on a predetermined display unit only when an interlock is not invalidated and when any one of the safety slaves and the safety local I/O units is "not participating in communication".

* * * * *